July 6, 1965  B. G. GEBAUER  3,193,657
WELDING APPARATUS

Filed March 23, 1962   4 Sheets-Sheet 1

INVENTOR.
BODO G. GEBAUER

BY
C. A. Gulbrandsen
ATTY.

INVENTOR.
BODO G. GEBAUER

INVENTOR.
BODO G. GEBAUER

BY
ATTY.

July 6, 1965   B. G. GEBAUER   3,193,657
WELDING APPARATUS
Filed March 23, 1962   4 Sheets-Sheet 4
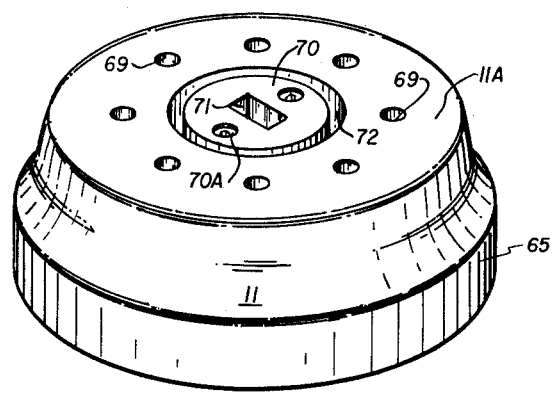
FIG. 5
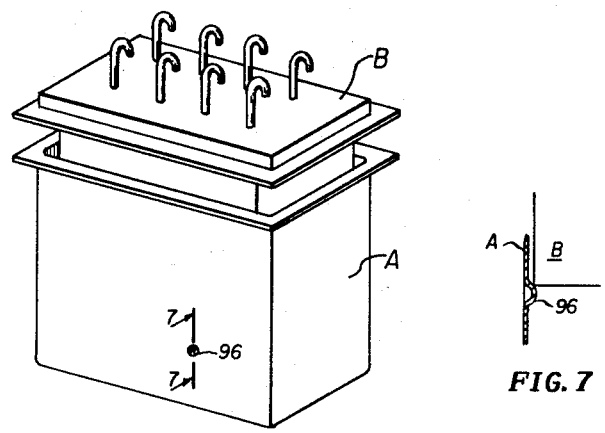
FIG. 6
FIG. 7
INVENTOR.
BODO G. GEBAUER
BY
C. A. Gulbrandsen
ATTY.

United States Patent Office 3,193,657
Patented July 6, 1965

3,193,657
WELDING APPARATUS
Bodo G. Gebauer, Carpentersville, Ill., assignor to Automatic Electric Laboratories, Inc., Northlake, Ill., a corporation of Delaware
Filed Mar. 23, 1962, Ser. No. 181,944
4 Claims. (Cl. 219—78)

This invention relates to a welding machine assembly for hermetically sealing enclosed products or components, such as relays. More particularly, the invention relates to welding machine assemblies which include a welding head, a washing compartment and a drying oven.

The invention is more specifically directed to improvements in the welding head for such an assembly. In particular, the invention provides a welding head which is capable of performing in one cycle three related operations; "evacuating" of the undesired air from a typical relay enclosure, "back-filling" the relay enclosure with a gas and welding the relay's header assembly to its outer can.

With today's increased emphasis on relay reliability it has become more compelling of manufacturers to eliminate virtually all atmosphere contamination as well as organic contaminants, usually introduced during the final sealing operation in the form of solder flux. Moreover, it has become very important to be able to determine more accurately the adequacy of the hermetic seal of the relay, the purity of the gas within the relay and the amount of contaminating flux residue within the relay. Heretofore these factors were more or less variables not subject to any accurate measure. As a result it was difficult or impossible to precisely determine the reliability of the prior art relay. This fact is attributed to the sealing facilities heretofore used in making the relays.

The facilities normally used consisted of a welding machine which was employed solely to weld the relay can to the header assembly, a vacuum pump which evacuated undesirable air from the relay enclosure and a gas supply line for back-filling the relay enclosure with a desired gas. The evacuating and back-filling generally were done through a small tube which was soldered to a small hole perforated in the relay enclosure. This took place after the header assembly was welded to the can. To complete operations on the relay the tube was pinched off near the hole in the can and the hole soldered closed. Thus, in the final assembly operation the adequacy of the seal of the soldered hole, the amount of gas leakage occurring during the soldering operation, and the amount of flux that had fallen into the relay were questions that could not be answered with any degree of authenticity. To the same extent no claim that a relay was free of contaminating elements could be absolutely justified.

According to the invention, on the other hand, the operation of soldering the small hole closed is completely eliminated as the evacuating and back-filling takes place prior to the welding of the relay's header assembly to the can. This sequence of operations is made possible by a novel welding head which performs the above-mentioned operation within a sealed chamber and during one cycle. With the use of this particular welding head no possibility of flux falling into the relay exists.

The principal object of the present invention is to provide a welding machine assembly for hermetically sealing enclosed relays which performs three operations in one cycle including the sealing of the relay.

Another object of the present invention is to provide a welding machine which will make possible the manufacture of more reliable relays.

Another object of the present invention is to provide a welding machine which reduces the unit cost of manufacture of relays by eliminating many of the prior art manual operations.

Still another object of the present invention is to eliminate the possibility of residue flux from entering the relay and contaminating its contacts.

Still another object of the present invention is to provide a welding machine assembly which in addition to performing the final assembly operation of the relays washes and drys them prior to final assembly.

In fulfillment of these objectives the invention features a welding machine assembly or arrangement for hermetically sealing enclosed relays and for evacuating and back-filling them with a particular gas. The assembly according to the embodiment of the invention shown herein comprises one or more novel welding heads which are located within a dry-box filled with nearly pure nitrogen gas. Furthermore, it comprises an enclosed washing unit connected to one end of the dry box and an enclosed drying oven which is in turn connected to the washing enclosure. Though each of the three units has its own enclosure they are so connected that in effect they form a single sealed relay assembly section which is virtually free of any atmospheric contamination. Therefore, relays which are placed in the section at an inlet chamber located at one end and are removed from an outlet chamber located at an opposite end are not exposed to the atmosphere. They are moved through the assembly section by means of an operator extending his hands through pliable gloves which extend from front panels of each enclosure.

The welding heads represent the principal part of the assembly section. Each welding head includes a pair of cooperating electrode elements. One of the electrodes, that is the top electrode, moves up and down relatively to the other or bottom electrode element which remains stationary. Coupled to the top electrode and surrounding one portion thereof is a cylindrical sleeve assembly which operates in such a manner as to form a sealed chamber between it and the lower electrode. The top electrode is connected and thereby moved toward the bottom elctrode by a drive shaft which is in turn actuated by means of compressed air. Each electrode includes a depression or more particularly a nesting plate which serves to hold or accommodate a relay which is placed therein. The bottom electrode more specifically includes a number of orifices which extend through its structure thereby forming in effect a manifold. Joined to the manifold at the bottom side of the electrode are two pipe lines through which evacuation of the aforementioned sealed chamber is accomplished and through which the same is back-filled with a gas. In addition an ejection mechanism for ejecting relays after completion of the welding operation is coupled to this electrode.

The type of relay adapted for the welding head described herein is the conventional enclosure type having a flanged header assembly and a correspondingly flanged outer can. To facilitate the evacuation and back-fill operations, that are performed by the welding head prior to the welding operation, the outer can is only partially assembled to the header assembly. This is so that there is clearance for gas to flow in and out of the relay enclosure during these two operations. Subsequent to these two operations the top electrode is brought upon the relay's header assembly and forces the header assembly and outer can together so their respective flanges are adjacent and are rigidly held between the two electrodes.

The single cycle of the welding head commences when an operator places a relay, partially assembled as aforementioned, into the nesting plate of the stationary electrode. This is followed by activating the drive shaft which brings the top electrode toward the bottom electrode. Since the bottom edge of the aforementioned cylindrical sleeve assembly extends below the bottom edge of the electrode the former makes contact with the stationary electrode when the latter is in effect in the middle of its stroke. This is to enable the cylindrical sleeve assembly to form the sealed chamber. The drive shaft temporarily stops movement of the top electrode after there is sufficient pressure between the cylindrical sleeve assembly and the stationary electrode and before the electrodes are in their welding position. This state of the cycle is followed by the evacuating and the back-fill operations. These operations occur in sequence and consequently are controlled by two control valves. After completion of these operations the sealed chamber as well as the relay placed therein are filled with a desired gas. The drive shaft again moves the electrode toward the end of its downward stroke. This action results in the top electrode pushing the header assembly, by means of its nesting plate resting on the edge of the flange, against the flange of the relay's outer can. Therefore, at the end of the top electrode's stroke the two electrodes are in contact with each other but for the adjacent flange of the relay placed therebetween. A current surge is then sent through the electrode which welds the adjacent flanges. The drive shaft restores the top electrode and the operator, with aid from the ejection mechanism which unseats the relay from the nesting plate, removes the relay from the electrode. This completes the cycle.

These and other objects and features of the invention will become more apparent from a perusal of the following detailed description of the aforementioned embodiment, taken with the accompanying drawings of which:

FIG. 5 is a perspective view of the bottom electrode of the welding head showing the nest for the relay assembly and the orifices through which evacuation and back-filling takes place.

FIG. 6 is a perspective view of an enclosed relay that is partially assembled so as to be adaptable for the welding head according to the invention.

FIG. 7 is a partial cross-section of the relay showing the dimple protrusion in the outer can as a means for maintaining the relay in a desired state for evacuation and back-filling.

Figure 1:
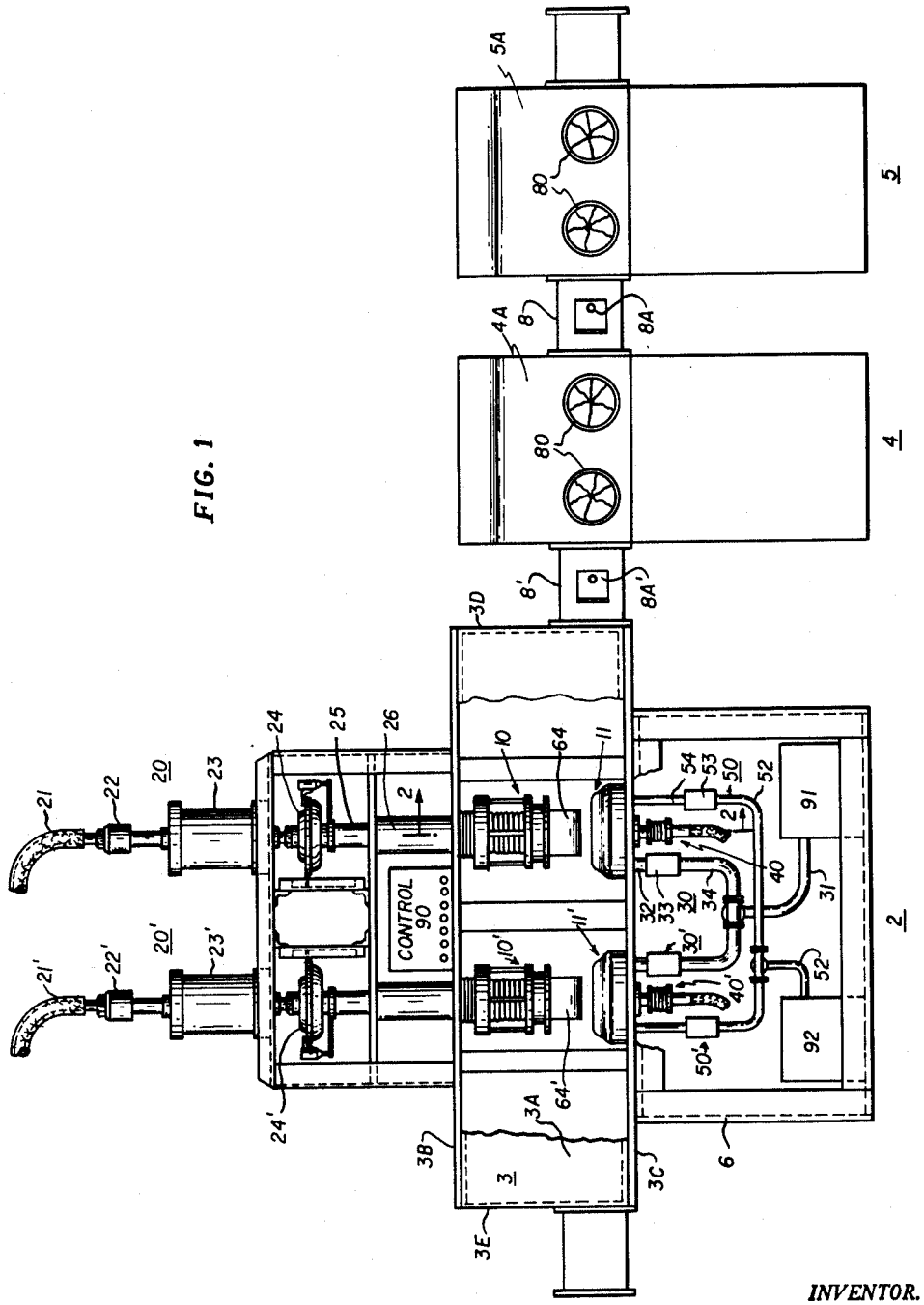
FIG. 1 is a front view of the welding machine assembly according to the invention.

Referring now to FIGURE 1 of the drawings in which character 5 denotes an enclosed washing unit, 4 an enclosed drying oven, and 2 a welding machine having its welding heads 10 and 10' enclosed in a gas filled dry-box 3. The three enclosures though representing three distinct cycles hereafter described are so connected as to form in effect a single sealed relay assembly section. The connection of the enclosures are made by means of connecting chambers 8 and 8' which are placed therebetween. At one end of the section is an inlet chamber and at the other end of the section is an outlet chamber. Each of the above mentioned chambers have preferably two trap doors (not shown) which serve to prevent contaminating air from entering the section. In addition chambers 8 and 8' have access doors 8A and 8A' respectively through which the relays can either be inserted or removed after the respective cycles. The result of the above features of the assembly section makes it virtually free of any atmospheric contamination. This environment is particularly desirable, if not a necessity, to achieve a positively contaminant free sealed relay.

The washing unit 5 is used to rinse the relays and remove any dirt or dust particles from their surfaces. From this enclosure the units pass through the chamber 8 and into the drying oven 4. The drying oven is used to dry off any atmospheric moisture on the relays before they enter dry-box 3.

The dry box is an air tight enclosure fixed to the welding machine at a proper working height and aligned with the drying oven 4 and the washing unit 5. It is preferably filled with a nearly pure nitrogen gas. Furthermore it is so constructed that its front panel 3A is preferably made of glass or transparent plastic. This enables the operator to observe what is taking place inside the enclosure, particularly in the area of the welding heads 10 and 10'. Panels 3B, 3C, 3D and 3E of this dry box are preferably made of a metallic material which provides rigidity and strength to the box.

Each of the above mentioned enclosures includes a number of flexible gloves 80 which are integrated with the front panels 3A, 4A and 5A of their respective enclosures to prevent leakage from the section. These gloves are the means through which an operator, by placing his hands therein, can move the relays through the enclosures. Furthermore, it is the means through which an operator can place a relay in the welding heads 10 and 10' or more specifically in the bottom electrodes 11 and 11'. The gloves are preferably made of a pliable or plastic material so as to allow the operator adequate finger and arm dexterity.

The principal part of the welding machine is the welding heads 10 and 10'. Though two of these heads are disclosed in the embodiment this is merely by way of an example and any number of such heads could be employed. Each welding head performs three or less operations in one cycle. Moreover each welding head is of such a design that it is capable of forming a sealed chamber prior to commencement of the three operations. These operations are evacuation, back fill and welding. In this connection it is to be mentioned that although these operations were heretofore performed in the prior art in connection with enclosed relays they were not performed within a sealed chamber free of contaminating elements. Furthermore, as opposed to the prior art facilities the enclosed relays manufactured with the facilities of the invention are not sealed by the use of solder and thus there is no possibility of solder flux flowing or falling into the relay enclosure.

To more clearly understand the detailed construction of the welding machine the operation thereof will first be described. To illustrate, an operator places a relay in one of the two bottom electrodes 11 or 11'. This is followed by pushing the designated button on the control panel 90 which brings down the cylindrical sleeve assembly 93 and forms a sealed chamber, described hereafter in more detail. Thus, the nitrogen gas of the dry-gas box is trapped in the sealed chamber. Since nitrogen gas is difficult to detect as compared to say helium gas it is desirable to evacuate the nitrogen gas from the chamber and from the relay placed therein and replace it with another gas. This operation is followed by back-filling the same area with more easily detected gas, as for instance a mixture of nitrogen and helium. By using such a mixture, leaks which could possibly occur after the welding operation can be more easily detected, as helium is more easily detected than pure nitrogen is. The back filling operation is followed by the welding operation which consists of a current surge sent through an electrical cable 64 and through electrodes 11 and 12 when they are holding an enclosed relay by their adjacent flanges.

More particularly, in the first operation the nitrogen in the chamber as well as the nitrogen in and about the relay placed therein is evacuated by means of one or more vacuum pumps 91. This operation is controlled by the opening and closing of a control valve 33 which is synchronized with the pumps. In the second operation the same chamber is back-filled with a gas from a gas supply source 92 whose composite is as aforementioned preferably 90% nitrogen and 10% helium. The back-filling operation is controlled by control valve 53. Both valves 33 and 53 are operated from control box 90 and in such a manner that when one valve is open the other is closed. Following these two operations both valves are closed and a drive mechanism 20 connected to electrode 12 for instance, moves the latter against the relay header assembly until the flange of the header assembly and the flange of the outer can are adjacent one another. In this position the welding operation takes place.

The aforementioned drive mechanisms 20 and 20' are connected to the top electrodes 12 and 12' and extend through panel 3B and operate, for example, by compressed air. Accordingly, each includes an air hose 21, which extends from a compressor (not shown) to an air pipe 22 which is rigidly fixed to frame structure 6. The pipe extends through a cylinder sleeve 23 and terminates in a diaphragm actuator 24. Actuator 24 produces a pressure differential between its inlet and outlet sides and thus causes pressure to be exerted upon driving shaft 25 which extends through a second sleeve 26 and mounts to electrode 12.

Coupled to the opposite electrode that is, electrode 11, is the relay ejection means 40, the evacuation means 30, and the back-fill means 50. The relay ejection means is located at the center of electrode 11 so as to be directly below a relay which is placed in a nest of the electrode. The evacuation means 30 consists of the aforementioned control valve 33, two pipes 32 and 34 and the vacuum pumps 91. Pipe 32 extends from electrode 11 to the control valve and pipe 34 extends from the control valve to the vacuum pumps 91.

The gas back-fill means comprises the aforementioned second control valve 53 which is placed between pipes 52 and 54. Pipe 52 is connected to a gas supply source 92. Pipe 54 on the other hand, extends between the control valve 53 and the electrode 11. As mentioned the pipe line through which evacuation is performed and the pipe line through which back-fill is performed are used in sequence and therefore when control valve 33 is open control valve 53 is closed and vice versa.

Referring now to FIGURES 2 through 7, fixed to the end of drive shaft 25 is a plate 18 which provides a flange to which electrode 12 is secured. This securement is made by way of bolts 18A. Shaft 25 extends through a hole in panel 3B of dry box 3. To prevent any gas from leaking out of the dry box between the panel 3B and the shaft flexible member 15 is used between the top surface of electrode 12 and the bottom surface of the panel 3B. The flexible member consists of a number of bellows which are preferably made of brass material and flexible to accommodate any movement of the electrode relative to the dry box. In this way the seals of the panels at the corners of the dry box are always constantly kept air tight. Moreover, flexible member 15 has two end flanges 16 and 17 which facilitate its securement. Bolts 16A are used to secure flange 16 to panel 3B and bolts 17A are used to secure flange 17 to the top of electrode 12.

Figure 2:
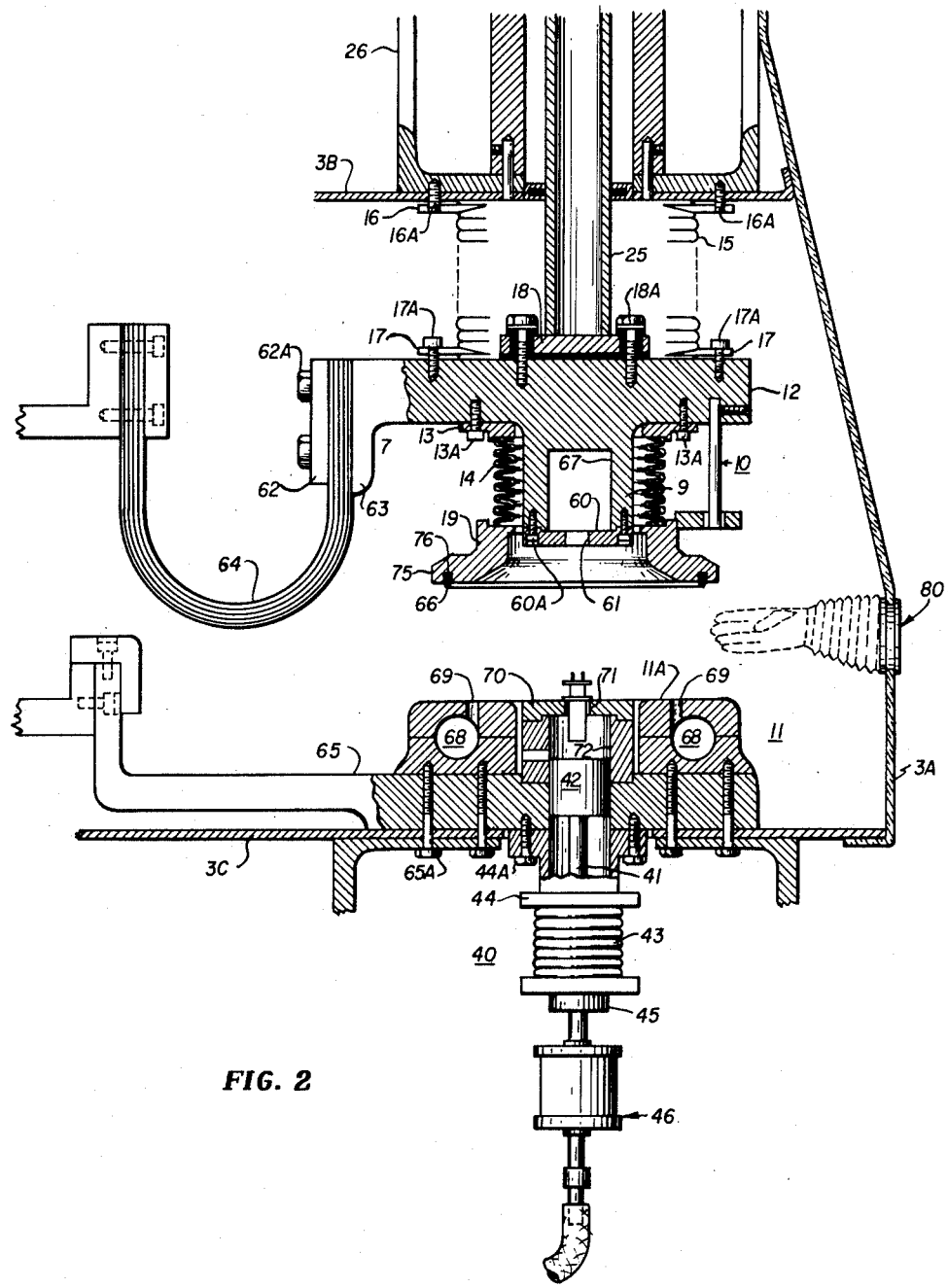
FIG. 2 is a cross-sectional view of the welding head in its non-operative or restored state taken substantially along the line 2—2 and 90° from the longitudinal axis of FIG. 1.
Figure 4:
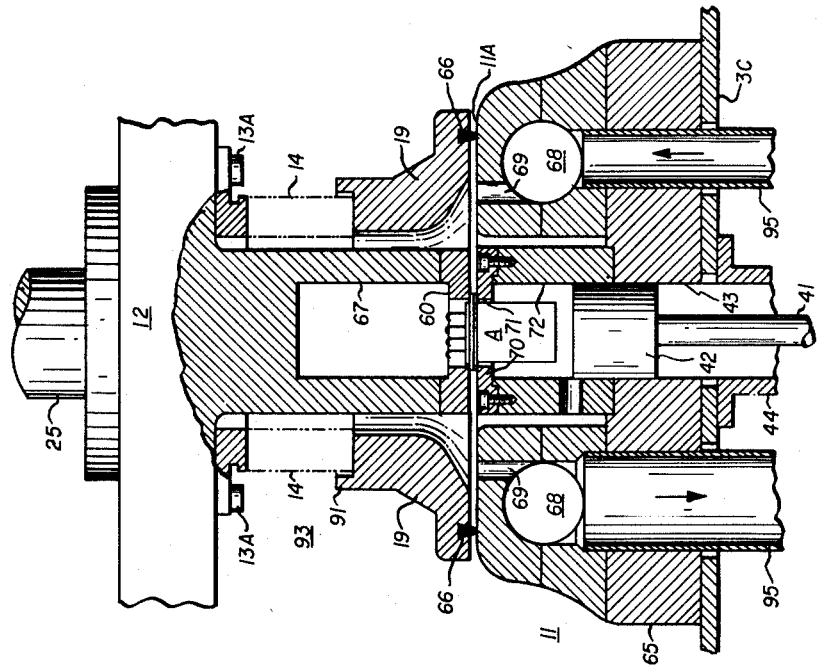
FIG. 4 is another cross-sectional view of the welding head showing its relative position during the welding operation.
Figure 3:
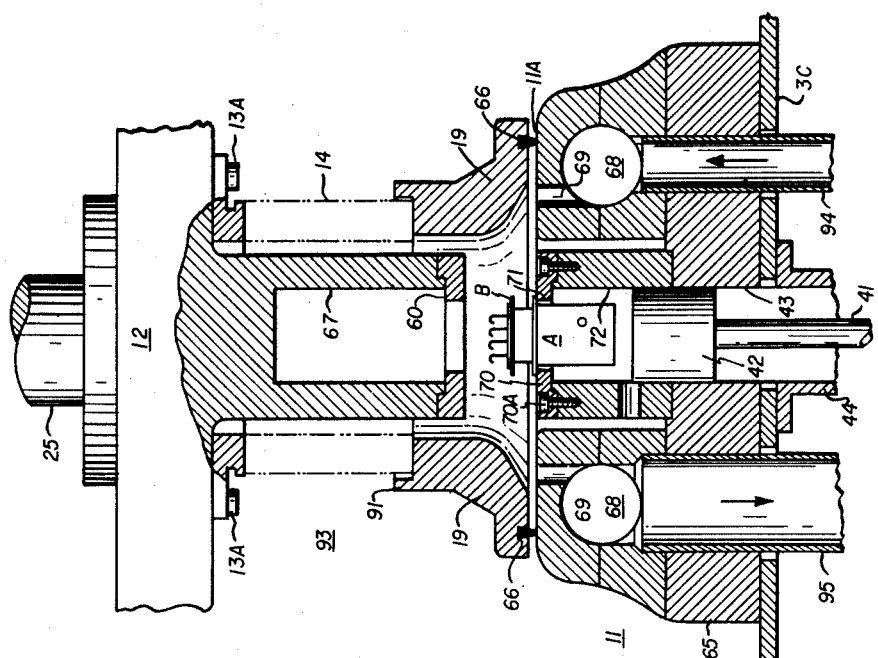
FIG. 3 is a second cross-sectional view of the welding head forming a sealed chamber for evacuation and backfill operations taken substantially 90° from the view of FIG. 2.

Electrode 12 is an integral structure which when viewed in cross section, such as in FIGS. 2–4, is substantially T-shaped with a flange 63 at one end. More specifically, it has a substantially flat top plate 7 with a concentric center rod 9 extending from its bottom side. Connected to flange 63 of plate 7 is an electrical cable 64 which carries a high current load from the power source (not shown) to the electrodes. Securement to plate 7 is made by means of a clamp 62 and corresponding bolts 62A. At the bottom edge of the center rod is a nesting plate 60 which is secured by bolt 60A and which has an aperture whose size corresponds to the header assembly. It will be noticed that in effect nesting plate 60 restricts the relatively large depression 67 of the electrode. The larger depression exists, however, only so that the electrode, by changing plate 60, can accommodate a wide variety of relay structures and configurations.

Also extending from the bottom side of circular plate 7 is a cylindrical sleeve assembly 93 which is formed around or concentric to rod 9. To facilitate the formation of a sealed chamber and the welding operation the cylindrical sleeve assembly extends below the bottom edge of plate 60 when in its non-operative position such as shown in FIG. 2. This enables the sealed chamber to be formed prior to the two electrodes 11 and 12 being in their welding positions. This characteristic is necessary as will more clearly be understood subsequently in order to evacuate the air from the relay and back-fill the same with a gas. That is, if the electrodes were in their welding state position evacuation and back-filling of the chamber would be of no avail as far as the relay placed in the electrode is concerned. Specifically the sleeve assembly comprises a flange 13, a second flexible member 14 and a base flange 19. These three components are secured to each other so to form in effect a single cylindrical wall. Flange 13 is fastened to circular plate 7 by bolts 13A. At the bottom surface 75 of base flange 19 is an internal groove 76 in which is placed a correspondingly shaped wedge 66. When the cylindrical sleeve assembly is against electrode 11 the wedge encompasses orifices 69, see FIG. 5, exposed at surface 11A and is preferably made of an insulating material such as rubber. FIGURE 3 shows the cylindrical sleeve assembly 91 in contact with electrode 11 thus forming the aforementioned sealed chamber. Moreover, FIGURE 3 shows the encompassing of the orifices 69. The insulating material of the wedge serves a two-fold purpose; first to insulate the cylindrical sleeve assembly from the electrode 11, and secondly to form a better seal than would be otherwise possible between two metallic elements.

It is to be understood that the movement of the cylindrical sleeve from its inoperative state to the state where it forms a sealed chamber is accomplished with the sleeve assembly and the center rod 9 moving coincidentally and not relatively. However, at the point where the cylindrical assembly contacts the electrode 11 movement thereafter becomes relative, that is, the movement necessary to change from the position shown in FIG. 3 to that of FIG. 4. Therefore, after a relay is placed in nesting plate 70 of electrode 11 the cylindrical sleeve assembly 93 and the electrode 12 move in a downward direction. This movement is continued until base plate 19, more specifically wedge 66 makes contact with electrode 11 at its top surface 11A. Movement is then stopped until the evacuation and back fill operations are completed. Hereafter movement is commenced and only electrode 12 continues to move downward and not the cylindrical sleeve assembly. Therefore it is necessary for the cylindrical sleeve assembly to compress. This feature is attributed to flexible member 14. At the completion of the welding operation both the cylindrical sleeve and electrode 12 are returned to their normal states, giving sufficient room for an operator to remove relay from the nesting plate 70.

As for the construction of the arrangement of electrode 11 it is mounted to a plate 65 which serves as ground potential. This plate is attached to panel 3C of the drybox. Securement of the plate 65 and electrode 11 is made by means of a plurality of bolts 65A which extend from the external side of panel 3C into tapped holes of the plate 65 and electrode 11. Thus, it is seen that the electrode 11 is a stationary electrode whereas electrode 12 is a movable electrode. Moreover, electrode 11 is substantially circular in shape, see for example FIGURE 4, and has flared out sides. It includes a plurality of orifices which in effect form a manifold. This manifold specifically consists of a relatively large orifice 68 which extends in a circle and a plane parallel to surface 11A. Branching off at the top side of this orifice is a number of smaller orifices 69 which extend in planes normal to the plane of surface 11A. Furthermore, branching off at the bottom side or orifice 68 are two primary orifices 93 and 94. The former leads into the evacuation pipe 34 and the latter leads into the back-filled pipe 54, see FIG. 3.

As aforementioned also coupled to electrode 11 is ejection means 40. This means is used to unseat a relay that has been placed in aperture 71 of nesting plate 70 after completion of the welding operation. In particular the means consists of an ejection nose 42, a rod 41 and an actuating means (not shown). The actuating means may be for example compressed air coming from the same compressor aforementioned. This actuating means through the means of a transfer link 46 acts upon rod 41 thereby causing it to move. To prevent any gas leakage between electrode 11 and ejection nose 42 both the ejector nose and its associated rod 41 operate within a confined area. This confined area is substantially a bored hole extending in the center of electrode 11. The hole is continued by a couple 44 which is bolted to the panel 3C, a third flexible bellows member 40 and a base 45 which is in turn connected to transfer link 46.

FIGURE 5 illustrates the relative position of orifices 69 and the aperture 71 which receives the relay. As seen the particular aperture is rectangular in shape, however, this is merely by way of example and it is emphasized that any shape can be used with the welding head so long as its size does not exceed the depression 72. In accord herewith it is to be noticed that a relay placed within electrode 11 is supported merely by nesting plate 70 holding the relay by its relatively narrow flange of the relay can. Similarly, during the welding operation, nesting plate 60 is brought down over the flange of the header assembly, pushing it against the flange of the can. As aforementioned both nesting plates 60 and 70 can be easily replaced with other nesting plates adapted for other types of relays. Replacement is facilitated by bolts 60A and 70A which are the means for securing the nesting plates to the respective electrodes.

Referring now to FIGURES 6 and 7 in particular, to effect the evacuation and back fill operations in this novel manner prior to a welding operation an important consideration is the necessity of a partially assembled relay such as shown in FIGURE 6. That is, in order to evacuate air from the relay enclosure, it is necessary to have a clearance between the two enclosure components. There must exist clearance between the relay can A and the corresponding relay header assembly B in order that there may be a free flow of gas in and about the relay during evacuation and back fill operations. This clearance can be provided by means of an indented dimple 96. This dimple would maintain the relative positions of the header assembly and the outer can. The dimple 96 is not, however, such a protrusion that it becomes difficult to push the header assembly into the outer can so that the flanges lie adjacent to each other.

The preferred embodiment of the invention has been described in detail, however, it is to be understood that there are modifications both in design and operation that could be made to this embodiment without departing from the spirit and scope of the invention as hereinafter claimed.

What is claimed is:

1. A welding head for welding an enclosed unit having a flanged header assembly and a correspondingly flanged enclosure can at their respective flanges comprising in combination:
   a support means;
   a first electrode and a second electrode aligned and engageable with each other,
   said first electrode reciprocally mounted to said support means and comprising a base portion with a circular shaped center portion having a free end extending therefrom, said center portion including a depression commencing at said free end and a face plate member, said face plate member having an aperture located substantially concentric with said depression to receive said header assembly and support said flange thereof,
   said second electrode fixed to said support means and having a circular shaped periphery, a flat top surface, and a network of air passageways extending therethrough, said top surface including a first aperture located in the center thereof and a set of apertures leading into said network of passageways, said set being spaced equal distance apart and concentric with said first aperture;
   means fixed within and received by said first aperture to receive said enclosure can and support said flange thereof;
   a flexible circular wall engageable with said second electrode and having two ends, one end being fixed to said base portion and the other end being free, a compressible section of bellows, and a flange, said flange including a wedge with a tapered cross-section to provide flexibility and a seal between said wall and said second electrode upon being engaged to thereby form an enclosed chamber about said first electrode and said top surface,
   driving means supported by said support means and operatively connected to said base portion to move said circular wall into engagement with said top surface and to move said first electrode into welding engagement with respect to said second electrode and to restore the same, evacuation means coupled to said network passageways for evacuating air from said chamber,
   and energizing means to energize said electrodes and weld said flanges together after said electrodes move into welding engagement.

2. A welding head for welding an enclosed unit having a flanged header assembly and a correspondingly flanged enclosure can at their respective flanges, comprising in combination:
   a first electrode and a second electrode moveable and engageable with respect to each other to jointly accommodate said enclosed unit therebetween, said first electrode comprising a base portion with a rod portion extending from one surface thereof, said rod portion including a depression and a face plate member with an aperture therein located substantially concentric with said depression to accommodate said flanged header assembly;
   said second electrode having a top surface, receiving means to receive said enclosure can, and a network of passageways extending therethrough and including a circular conduit extending in a plane parallel to said top surface, a plurality of passageways extending from one side of said circular conduit to said top surface and spaced equal distance apart and concentric with respect to said receiving means, an evacuating orifice connected to the opposite side of said circular conduit and a gas backfill orifice which also extends from the said opposite side;
   a flexible means connected to said base portion and concentrically surrounding said rod portion, said flexible means being engageable with said second electrode to form an enclosed chamber about said electrodes,
   a second means connected to said flexible means to provide a seal between said flexible means and said second electrode,
   driving means operatively connected to said base portion to move said flexible means into engagement with said second electrode and to move said first electrode into welding engagement with respect to said second electrode and to restore the same,
   evacuation means coupled to said second electrode for evacuating air from said chamber,
   backfill means operatively connected to said passageways to backfill said chamber with a selected gas subsequent to said evacuation and prior to said welding, energizing means to energize said electrodes and weld said flanges together after said electrodes are moved into an engaged position, and an ejection means coupled to said second electrode for ejecting a relay placed between said first and second electrode after completion of welding said header assembly to said enclosure can.

3. A welding head for welding an enclosed unit having a flanged header assembly and a correspondingly flanged enclosure can at their respective flanges, comprising in combination:

a first electrode and a second electrode moveable and engageable with respect to each other to jointly accommodate said enclosed unit therebetween, said first electrode comprising a base portion with a rod portion extending from one surface thereof, said rod portion including a depression and a face plate member with an aperture therein located substantially concentric with said depression to accommodate said flanged header assembly;

said second electrode having a top surface, receiving means to receive said enclosure can, and a network of passageways extending therethrough and including a circular conduit extending in a plane parallel to said top surface, a plurality of passageways extending from one side of said circular conduit to said top surface and spaced equal distance apart and concentric with respect to said receiving means, an evacuating orifice connected to the opposite side of said circular conduit and a gas backfill orifice which also extends from the said opposite side;

a flexible means connected to said base portion and concentrically surrounding said rod portion, said flexible means being engageable with said second electrode to form an enclosed chamber about said electrodes, a second means connected to said flexible means to provide a seal between said flexible means and said second electrode, driving means operatively connected to said base portion to move said flexible means into engagement with said second electrode and to move said first electrode into welding engagement with respect to said second electrode and to restore the same, an evacuation assembly comprising a vacuum pump means, a piping arrangement which extends from said pump means to said passageways, and a control valve located within said arrangement for controlling said evacuating from said sealed chamber, a backfill assembly to backfill said chamber with a selected gas subsequent to said evacuation and prior to said welding and comprising a gas supply means, a second piping arrangement extending from said supply means to said passageways and a second control valve located within said second piping arrangement for controlling said back-filling of said chamber and being synchronized so as to follow the operation of said first control valve, energizing means to energize said electrodes and weld said flanges together after said electrodes are moved into an engaged position, and an ejection means coupled to said second electrode for ejecting a relay placed between said first and second electrode after completion of welding said header assembly to said enclosure can.

4. A welding head as claimed in claim 3 wherein said ejection means comprises an ejection nose operable within a bore in said second electrode, a shaft connected to said ejector nose, and activating means to move said shaft and said ejector nose against a relay placed between said electrodes.

References Cited by the Examiner
UNITED STATES PATENTS

| | | | |
|---|---|---|---|
| 1,569,323 | 1/26 | Hoffer | 219—78 |
| 2,053,417 | 9/36 | Brace | 219—72 |
| 2,058,498 | 10/36 | Perry | 29—430 |
| 2,299,543 | 10/42 | Humphrey | 219—80 |
| 2,326,296 | 8/43 | Harrison et al. | 219—78 X |
| 2,746,139 | 5/56 | Van Pappelendam | 29—455 |
| 3,020,387 | 2/62 | Basche et al. | 219—72 |
| 3,020,389 | 2/62 | Gorman | 219—72 |

RICHARD M. WOOD, *Primary Examiner.*